United States Patent [19]
Samuelson

[11] 3,833,291
[45] Sept. 3, 1974

[54] CAMERA LENS ATTACHMENTS

[75] Inventor: David Wylie Samuelson, London, England

[73] Assignee: Samuelson Film Service Limited, London, England

[22] Filed: Apr. 5, 1973

[21] Appl. No.: 348,051

[30] Foreign Application Priority Data
Apr. 6, 1972 Great Britain................ 15970/72

[52] U.S. Cl. ............................. 95/11 R, 350/286
[51] Int. Cl. ....................................... G03b 17/17
[58] Field of Search ................ 95/11; 350/286, 287

[56] References Cited
UNITED STATES PATENTS
1,797,849  3/1931  Aschenbrenner...................... 95/125
2,592,524  4/1952  Grant...................... 95/11

*Primary Examiner*—John M. Horan
*Attorney, Agent, or Firm*—Cushman, Darby & Cushman

[57] ABSTRACT

An attachment is provided for the taking lens of the camera for deviating the optical axis of light entering the lens from an object being photographed. The attachment comprises a Bauernfeind prism, or other deviating prism of a kind providing an even number of successive reflections of the transmitted light beam between incidence and emergence. The prism is supported by a mounting by which it is detachably mounted on the lens holder of the camera with the emergence face of the prism directly in front of the lens and perpendicular to the optical axis of the lens.

1 Claim, 4 Drawing Figures

CAMERA LENS ATTACHMENTS

This invention relates to lens attachments for still, cinematograph and television cameras, and an object of the invention is to provide a lens attachment by which a deviation of the viewing axis of the camera "taking" lens (or lens system) can be produced. The "taking" lens in this context means the lens by which a focussed picture of the object is formed at the focal plane of the camera for photographing or t.v. scanning, as distinct from a separate viewfinder lens for visually aiming the camera.

According to the present invention there is provided for the taking lens of a camera an attachment comprising a deviating reflecting prism supported in a mounting adapted to be detachably secured to the lens holder of the lens with the emergence face of the prism in front of the lens, the prism being of a kind providing an even number of successive reflections of the transmitted light beam between incidence and emergence, without alteration of the image attitude of the beam.

Such an attachment produces a deviation of the light from the object immediately before entry into the camera lens, and without a reversal (looking glass effect) or inversion of the picture.

A preferred form of prism for use in such an attachment is the Bauernfeind prism, which produces a double internal reflection of the transmitted light accompanied by deviation through a substantial angle, and has a very wide field of view. However other double-reflecting prisms may be employed in cases where a narrower field of view is acceptable.

The use of such an attachment enables photographs to be taken from positions which would otherwise be impracticable, uncomfortable or impossible. Such shots might be from a very low angle, or so-called "table-top" shots. In such instances there is a physical limit to the closeness of the camera taking lens to the ground or "table-top" due to obstruction by the body of the camera below the lens. If a shot from ground level is required to "look up," this may ordinarily require that the operator shall lie uncomfortably on the ground. Again, if it is required to take photographs from inside a small confined space, e.g. inside a glass of beer, the available space may be too small to accommodate a camera.

One way to overcome these problems might be to use a mirror to deviate the light beam entering the lens, but this would result in a reversal of the picture, the so-called looking-glass effect, which is particularly unacceptable in cinematography since it results in the geometry of the film being upset. If two mirrors are used to provide successive reflections, as in a periscope, the outer mirror has to be so large that a desired "low-angle" shot may not be possible.

All these difficulties can be overcome, and the special shots referred to can be taken, with the aid of a lens attachment according to the invention, the light deviation produced by the attachment making it possible to shoot from very close to the ground or from within a confined space, without reversal of the picture.

The invention may be carried into practice in various ways, but certain specific embodiments will now be described by way of example only, and with reference to the accompanying drawings in which.

Figure 1:
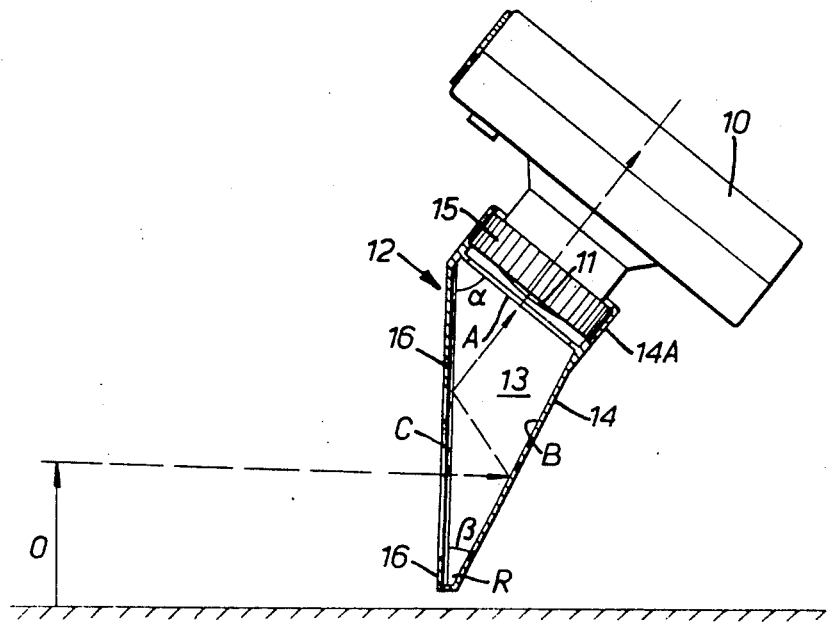
FIG. 1 is a diagram of a camera fitted with a lens attachment for low-level upward shots.

In the embodiment of FIG. 1, a camera 10 having a taking lens 11 is removably fitted with an attachment 12 comprising a Bauernfeind prism 13 mounted in a housing 14 having a mounting ring 14A which is a push fit over the lens holder 15 of the camera. The Bauernfeind prism 13 is held in front of the lens 11 by its mounting ring 14A with its emergence face A facing the camera lens, so that the optical emergence axis of the prism through face A is coaxial with the optical axis of the lens 11. A mask 16 is fitted over the incidence face C of the prism, and the reflecting face B is provided with an internally-reflecting coating, for example of silver.

For taking a low-level horizontal shot of an object O, the camera is inclined downwardly with the edge D of the prism close to or resting on the ground, as shown in FIG. 1. The path of incident light rays towards the lower part of the incidence face C of the prism from the object O can then be horizontal, as shown, and the light from O entering the incidence face C will first be reflected internally from the silvered reflecting face B, and will then be reflected internally from another part of the incidence face C, and will emerge normally, without refraction, through the emergence face A into the camera lens, the deviation produced by the prism corresponding to the angle $\alpha$ of the prism, and no reversal of the image being produced. The angle $\alpha$ is the angle of inclination of the incidence face C to the emergence face A, which by definition of a Bauernfeind prism is twice the angle $\beta$ between the incidence face C and the reflecting face B.

Figure 2:
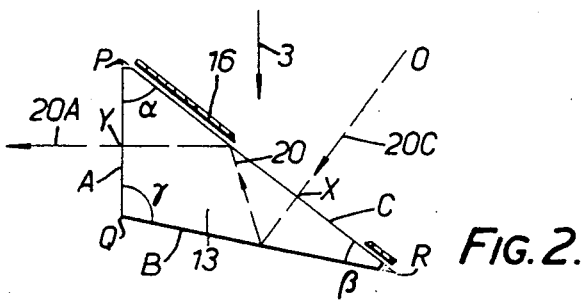
FIG. 2 is a diagram of the prism of the lens attachment of FIG. 1, in side elevation.
Figure 3:
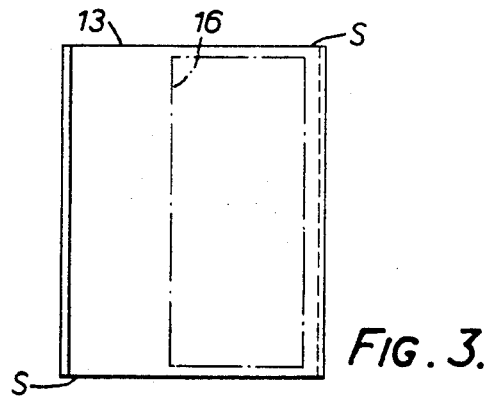
FIG. 3 is a plan view of the prism of FIG. 2, seen in the direction of the arrow 3 in FIG. 2.

The design and dimensions of various examples of Bauernfeind prism for use in the attachment of FIG. 1 will now be described with reference to FIGS. 2 and 3. FIG. 2 shows a prism having optical faces A, B and C as previously referred to, and having apices P, Q and R.

The path X-Y followed by the optical axis through the prism is shown diagrammatically at 20 in FIG. 2, and is independent of the refractive index. It is desirable to minimise the glass path length through the prism, and to ensure that the incident and emergent optical axes 20C and 20A are strictly normal to the external polished surfaces C and A respectively.

The principal parameter in the design of the prism is the angle $\alpha$ between the sides A and C. To enable suitable values of $\alpha$ to be chosen, for an attachment for use with wide angle lenses, whilst providing adequate safety factors as regards the critical angle of reflection and the avoidance of ghost or flare imaging characteristics, glass with a higher refractive index than usual, for example in the region of 1.6, is preferred for the prism. Using such glass, optimised prism dimensions can be chosen for use with different lenses.

EXAMPLE I

The following example is of a Bauernfeind prism optimised for use in an attachment 12 for a typical cinematograph lens of 25 mm focal length, and it can be shown that the required length of the prism face A for a 25 mm lens is also correct for a 50 mm lens and is ample for 32 and 40 mm lenses. The dimensions and other data of the optimised prism are:

| | | |
|---|---|---|
| Angle α | | 51°±3' |
| Angle β (=½α) | | 25°±3' |
| Angle γ | | 103°±3' |
| | | Sharp-Edged Dimensions |
| Length PQ of Emergence face A | | 44.0 mm |
| Length QR of Reflecting face B | | 79.43 mm |
| Length PR of Incidence face C | | 99.4 mm |
| Distance QY | | 22.0 mm |
| Distance RX | | 40.56 mm |
| Width of prism | | 92.0 mm |
| Mask 16 Aperture | Height | 68.0 mm |
| do. | Width | 90.0 mm |
| Material (Type 623603) | | Refractive Index Nd>1.60 Abbe V Value >58.0 Fine Annealed |

The surface A is polished to ±5 rings, ±1 ring irreg., and is given an anti-reflecting coating.

The surface B is polished to ±3 rings, ±½ ring irreg., and is given an internally-reflecting coating of silver or copper and varnish (or equivalent).

The surface C is polished to ±3 rings, ±½ ring irreg., and is given an anti-reflection coating.

The side faces S (FIG. 2) and chamfered edges are painted black.

The mask 16 must not make optical contact with the polished face C of the prism, or the critical angle of reflection will be impaired.

This prism (referred to as prism I) is designed for use with a typical 25 mm lens as mentioned, and is mounted in its holder 14 so that the optical axis 20A through the emergence face at Y will be coincident with the optical axis of the lens to which the attachment is fitted.

Prism I may also be used in an attachment for typical cinematograph lenses of 32, 40 and 50 mm focal lengths, using masks on the incidence face whose aperture sizes are respectively 53 × 66 mm, 48 × 59 mm and 52 × 60 mm, the mask aperture being symmetrical with respect to the optical axis point X.

To reduce the "off-the-ground" dimension RX for use with a camera lens of longer focal length in the manner shown in FIG. 1, it is possible to mount the prism in a different position in its holder ring 14 such that the optical axis 20A of the prism is displaced along the face A relatively to the edge Q. The optimised displacements are indicated by the following table.

| Lens (focal length) | Distance QY | Distance RX |
|---|---|---|
| 32 mm | 16.0 | 34.56 |
| 40 mm | 16.0 | 34.56 |
| 50 mm | 20.0 | 38.56 |

The mask 16 retains its previous dimensions appropriate to the lens in use, but is centred about the modified incident optical axis 20C defined as above by the "off-the-ground" dimension RX.

EXAMPLE II

This example defines a prism (prism II) designed for use with typical lenses of 32, 40 and 50 mm focal lengths, but not with a 25 mm lens. The angle α is greater than in prism I, and the "off-the-ground" distance RX referred to is correspondingly reduced.

| | |
|---|---|
| Angle α | 54°±3' |
| Angle β (=½α) | 27°±3' |
| Angle γ | 109°±3' |
| Length of Face A | 44.0 mm (sharp-edge dimension) |
| Off-the-ground Distance RX | 34.0 mm |

Other dimensions can be calculated accordingly. The mask dimensions are the same as in Example I.

EXAMPLE III

This example defines a prism (prism III) designed to suit only two lens sizes, namely 32 mm and 40 mm lenses. The angle α is again 54° but the sharp-edge dimension of face A is reduced to 36 mm. This results in a smaller prism than prism II, with an "off-the-ground" dimension RX of about 28 mm.

The refractive index of the material of prisms II and III is not critical, but the use of the material of higher than usual index (1.6) enables the chamfering of Edge R to be slightly larger and this reduces the effective "off-the-ground" dimension RX.

Prisms II and III can be much narrower than prism I, on account of the narrower angles of the fields of view of the lenses with which they are designed to be used.

Figure 4:
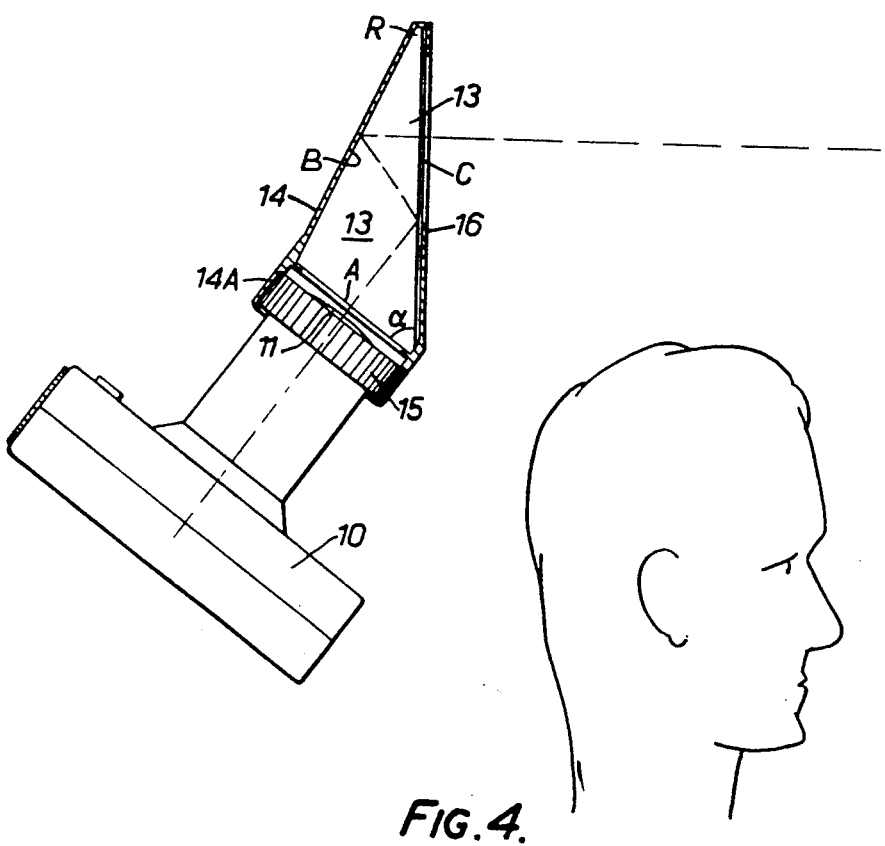
FIG. 4 shows the camera fitted with the lens attachment in a manner arranged to give added elevation.

FIG. 4 shows another way in which the lens attachment incorporating a Bauernfeind prism such as prism I, II or III can be used. In this case the attachment 12 is mounted on the camera lens mounting 15 with the prism 13 the other way up (inverted), facilitating the use of the camera in an upwardly-pointing direction to give increasing elevation for a horizontal shot. For instance, where the camera is fitted with a zoom lens, which is physically quite long, the use of the lens attachment mounted as indicated enables the operator to shoot over the heads of a crowd, or to shoot over an obstruction between him and the object to be photographed or televised.

Similarly, either embodiment of lens attachment might be placed in a lateral orientation on the camera lens for shooting round a corner.

The attachment is preferably employed with a camera of the single-lens reflex type, so that the operator will be able to see in the viewfinder the actual picture formed by the deviated light beam which will be photographed. If however a camera with a separate viewfinder or a twin-lens reflex is being used, a second Bauernfeind prism lens attachment may be similarly fitted over the viewfinder lens or window to show the deviated picture.

What I claim as my invention and desire to secure by Letters Patent is:

1. An attachment for the taking lens of a camera of the type having a single taking lens and which comprises a deviating prism supported in a mounting adapted to be detachably secured to the lens holder of the single lens with the emergence face of the prism in front of the single lens, the prism being of a kind providing two successive reflections of the transmitted light beam between incidence and emergence without alteration of the image attitude of the beam, said prism including an incidence face through which light enters the prism, a reflecting face separated from the incidence face by a first predetermined angle and which reflects light entering the prism back to a portion of said incidence face, said prism having an emergence face substantially parallel to the plane of the single taking lens, the dimensions of the incidence face and the reflecting face of the prism being predetermined dimensions and said prism formed of glass having a predetermined refractive index whereby the field of view of the camera is substantially as great with the attachment as without it and including a mask disposed adjacent to but spaced from the incidence face, said mask having an aperture through which an incident light beam may enter the prism and said mask functioning to mask the portion of the incidence face which again reflects the light reflected by the reflecting face.

* * * * *